United States Patent [19]

Raboud et al.

[11] 4,307,787
[45] Dec. 29, 1981

[54] ELECTRONIC SCALES WITH TWO RANGES

[75] Inventors: Norbert Raboud, Aire-Geneva; Olindo Baruffa, Thonex, both of Switzerland

[73] Assignee: Mefina S.A., Fribourg, Switzerland

[21] Appl. No.: 162,603

[22] Filed: Jun. 24, 1980

[30] Foreign Application Priority Data

Jul. 11, 1979 [CH] Switzerland ............... 6471/79

[51] Int. Cl.³ .................. G01G 1/34; G01G 3/14; G01G 3/08
[52] U.S. Cl. .................. 177/204; 177/211; 177/229
[58] Field of Search ............... 177/203, 204, 211, 229

[56] References Cited

U.S. PATENT DOCUMENTS 3,700,055 10/1972 Gaulier .................. 177/204
3,994,161 11/1976 Trozera .................. 177/211 X Primary Examiner—George H. Miller, Jr.
Attorney, Agent, or Firm—Emory L. Groff, Jr.

[57] ABSTRACT

In order to obtain, in an electronic balance, ranges which are in a predetermined ratio, for example 1:10, there is provided a measuring arm provided with strain gauges adapted to measure the deformation of this arm when it is subjected to a constraint or force. Between the arm and a knife-edge there is disposed a measuring annulus likewise provided with strain gauges adapted to measure the deformation of this annulus when it is subjected to a weighing force. The balance is operated in such a manner that the force or mass of the weight to be measured at the moment of weighing is exerted firstly on the arm via the annulus, until the arm contacts the abutment. This determines the small measuring scale. If the weight is higher than this value, the force is subsequently exerted solely on the annulus which presents a resistance in the region of 10 times greater and determines the second measuring scale.

7 Claims, 5 Drawing Figures

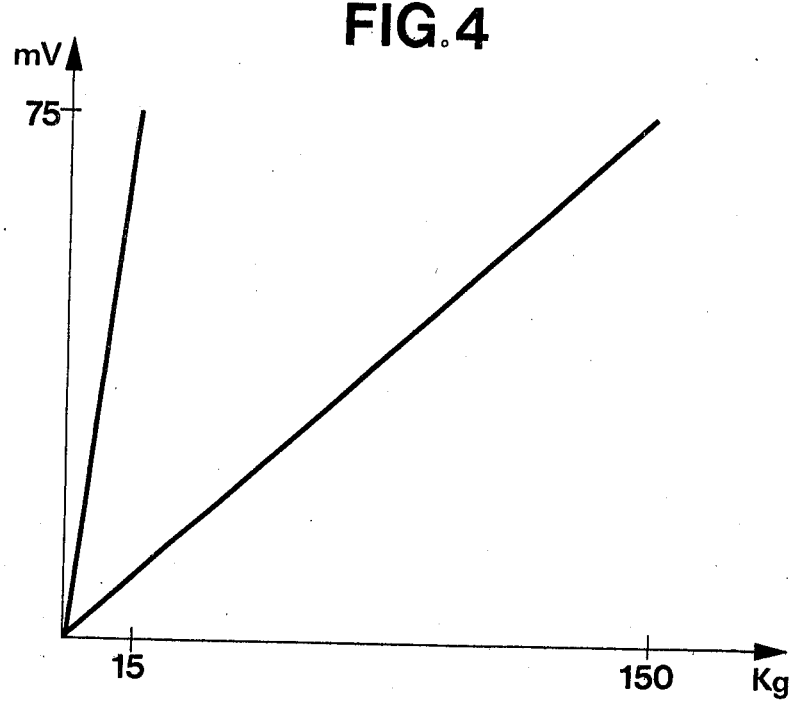
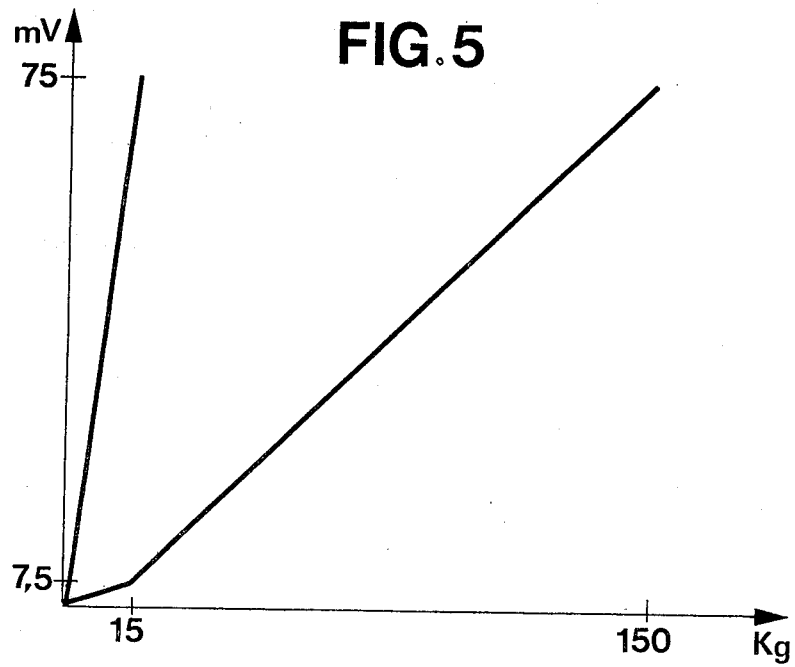

ELECTRONIC SCALES WITH TWO RANGES

The present invention concerns an electronic balance comprising a measuring-bridge formed by strain gauges disposed on at least one measuring member, two weighing scales and means for changing the scale, operable in such a manner that the upper limits of the scales are in a predetermined ratio and that the output signal of the measuring bridge is a linear function of the weight.

It is an object of the present invention to provide a balance of simple conception in which the changing of the scale permits a substantial enlargement of the measuring field.

According to the present invention there is provided an electronic balance comprising a measuring-bridge formed by strain gauges disposed on at least one measuring member, two weighing or measuring scales, and means to change the scale, adapted to operate in such a manner that the upper limits of the scales are in a predetermined ratio and that the output signal of the measuring bridge is a linear function of the weight, characterised in that the ratio between the slope of the output signal of the measuring-bridge as a function of the weight of the lower scale and as a function of the weight of the upper scale is equal to the said predetermined ratio.

This arrangement permits the use of only a single apparatus which, for example, is able to serve in turn as a kitchen balance (up to 15 kg) and for human weighing (up to 150 kg).

The accompanying drawings represent, schematically and by way of example, three embodiments of balance in accordance with the invention and in which:

FIGS. 4 and 5 are graphs illustrating the variation of the output signal as a function of the weight for the different embodiments.

Figure 1:
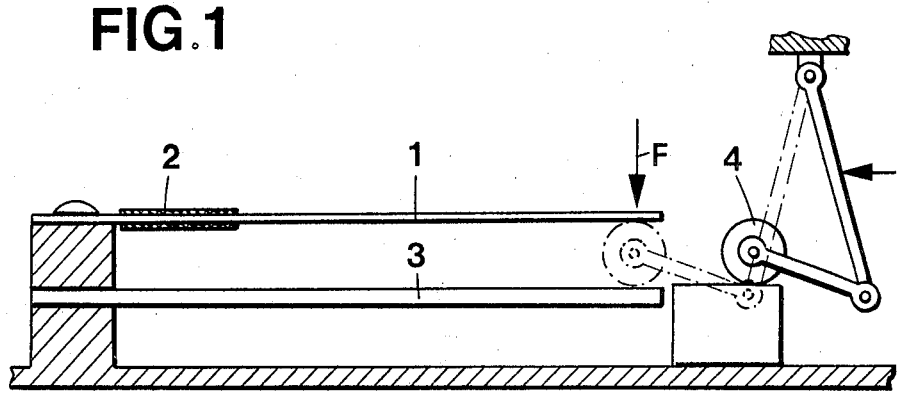
FIGS. 1 to 3 are each views in vertical section of a part of a balance adapted to execute the measurement of the deformations of the three embodiments.

A balance is partially represented in FIG. 1 and comprises a first weighing arm 1 provided with strain gauges 2 adapted to measure the deformation of the arm 1 when such is subjected to a vertical strain or force represented by the arrow F. Two gauges working in tension and two working in compression are provided and the four gauges are connected together to form a measuring-bridge. A second arm 3 is disposed parallel to the first arm 1 and is adapted to be secured to the first arm when a connecting member 4 is disposed between the two as indicated in broken line in FIG. 1.

The principle of operation is as follows:

When the connecting member 4 is moved away from arms 1 and 3, as shown in full line in FIG. 1, the force F exerted by the weight to be measured (not shown) is exerted solely on the arm 1 and the output signal of the measuring bridge formed of the strain gauges 2 is proportional to the force applied. The measuring range is relatively small, for example from 0 to 15 kg. When the connecting member 4 interconnects the two cantilever arms 1 and 3 interdependently, the resistance to the force F is higher since the force F is applied to the two arms at once. The whole is operated in a manner such that the measuring range is ten times greater, for example, being 0 to 150 kg.

The display of the weighing result is effected by any known means.

In FIG. 4 there is shown the output signal of the measuring-bridge as a function of the weight for the two scales conceived. In the two cases the lower limit is 0 kg. The upper limits are in a ratio of 1:10, whilst keeping the same values of the output signal—these values being given by way of example.

Figure 2:
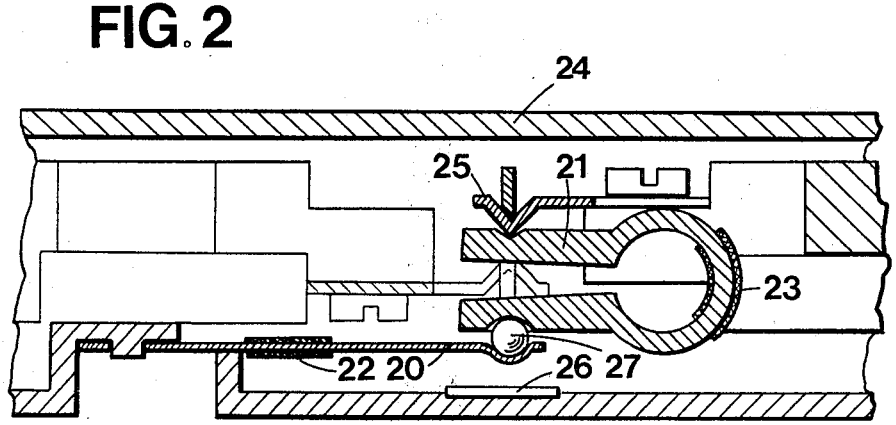
Figure 3:
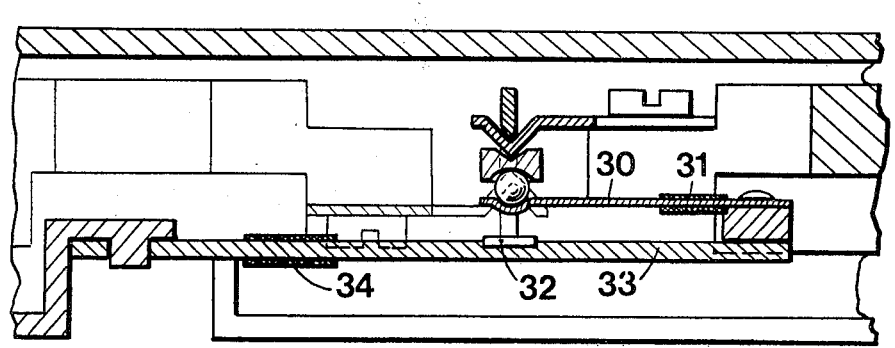

The embodiments shown in FIGS. 2 and 3 permit an automatic change over of the measuring scale when, during one weighing, the upper limit of the lower scale is attained.

The balance shown partially in FIG. 2 comprises a measuring arm 20 and a measuring annulus 21. This annulus 21 is mounted between a knife 25 and a ball bearing 27, resting on the arm. This permits the avoidance or minimisation of sliding and friction. Each measuring member is provided with strain gauges 22 and 23 respectively mounted on measuring-bridges respectively and each ensuring the measurement of a scale or range. The whole is operated in such a manner that the force of the weight to be measured is transmitted by a weighing platform 24, on the annulus 21, via knife-edge 25, and is at first transmitted to the arm 20—the gauges 22 measuring the deformation of this arm 20. This determines the small scale. When the weight is such (for example 15 kg) that the arm 20 is bent so that it comes into contact with an abutment 26 secured to the framework of the balance, the force of the weight is then exerted solely on the annulus 21 and the deformation thereof measured by the strain gauges 23. The annulus 21 is chosen such that it presents a deformation varying linearly in a proportion of 1 to 10 with respect to the arm 20. As regards the measuring-bridge formed by the strain gauges 23, it presents a linear output signal the maximum value of which is equal to that of the output signal of the measuring-bridge formed by the strain gauges 22—the measuring field or range being 10 times greater. It is evident that the balance is equipped with electronic circuits for the adjustment (tare), the display, possibly for the return to zero, and with a circuit ensuring the automatic switching of one measuring bridge to the other occurs when the arm 20 is in contact with the abutment 26 and the measuring scale is thus changed.

In the embodiment shown in FIG. 3, a first arm 30 is provided having strain gauges 31 and is acted upon during weighing. The arm 30 is secured at one end to one end of an arm 33 whilst the other end of arm 33 is secured to the framework. When the arm 30 attains a certain deformation, it contacts (at 32) the second arm 33 likewise provided with strain gauges 34. The functioning principle remains the same, the force exerted first on the arm 30 determines the lower measuring scale and the force exerted subsequently on the arm 33 determines the higher measuring scale—the transition being effected automatically. The proposals concerning the electronic circuits for the balance of FIG. 2 apply to those of FIG. 3.

It is to be noted that in these two last embodiments, the annulus 21 and the arm 30 already undergo a slight deformation during weighing in the lower scale field. It is only in fact from the moment that one passes to the upper scale that the slope of the output signal of the measuring-bridge is in the chosen ratio of the upper limits—in the examples described this ratio is of 10:1. What precedes is illustrated in FIG. 5, representing the variation of the output signal as a function of the weight for the two embodiments represented in FIGS. 2 and 3.

It is thus seen that the same measuring instrument can be used for the two very different functions e.g. as for weighing a human being or for weighing cooking ingredients whilst conserving a high precision thanks to a linear measure—the ratio between the two upper limits of the scales not necessarily being 1:10.

We claim:

1. An electronic balance comprising support means, at least one measuring member mounted on said support means, a measuring-bridge formed by strain gauges disposed on said at least one measuring member, two weighing or measuring scales associated with said strain gauges and means to change the scale adapted to operate in such a manner that the upper limits of the scales are in a predetermined ratio and that the output signal of the measuring-bridge is a linear function of the weight, wherein the ratio between the slope of said output signal of the measuring-bridge as a function of the weight of said lower scale and as a function of the weight of said upper scale is equal to the said predetermined ratio.

2. A balance according to claim 1, comprising two measuring members each provided with strain gauges, the whole being operated in such a manner that the force applied at the moment of weighing is first of all exerted on one of said members until it is in contact with an abutment on the second arm, the maximum deformation obtained being measured by the bridge corresponding to the upper limit of the lower scale, then the force is exerted on the second member, presenting a resistance to the force which is higher than that of the first member thus determining the second measuring scale, wherein the two members are constituted by two arms normally disposed parallel to each other, the abutment being situated on the second arm and the force being exerted on the second arm via said first arm.

3. A balance according to claim 1, wherein the respective values of the two lower limits of said weighing scales are equal.

4. A balance according to claim 3, further comprising two arms with said strain gauges being disposed on one of the arms, and a connecting member adapted to be disposed between said two arms to interconnect such, the whole being operable in such a manner that, in the absence of the said connecting member between said arms, the force exerted by the mass to be weighed at the moment of weighing is exerted only on said arm carrying the gauges which thus determines the smallest scale and that, when the connecting member is in place between the two arms and interconnecting such, the force exerted by the mass to be weighed is applied to the two arms at the same time thus determining said larger scale.

5. A balance according to claim 1, comprising measuring members each provided with strain gauges and the whole being operated in such a manner that the force at the moment of weighing is first transmitted to a first, one of the members via another, second member until the first member contacts an abutment, the maximum deformation of the first member measured by the bridge corresponding to the upper limit of the lower scale; the force, if of sufficient magnitude, is subsequently exerted solely on the second member determining the upper measuring scale.

6. A balance according to claim 5, wherein said abutment is secured to the supporting framework of the balance.

7. A balance according to claim 6, wherein the first member is an arm secured to the framework, and said second member is a measuring annulus disposed between the arm and a knife-edge, the resistance to a bending force of the arm being lower than that of the annulus.

* * * * *